June 3, 1930. C. W. COLLINS Re. 17,687

BRAKE OPERATING MECHANISM

Original Filed July 13, 1926

INVENTOR
CHARLES W. COLLINS
BY Charles S. Evans
HIS ATTORNEY

Reissued June 3, 1930

Re. 17,687

UNITED STATES PATENT OFFICE

CHARLES W. COLLINS, OF SEATTLE, WASHINGTON

BRAKE-OPERATING MECHANISM

Original No. 1,637,440, dated August 2, 1927, Serial No. 122,064, filed July 13, 1926. Application for reissue filed March 14, 1929. Serial No. 347,148.

My invention relates to brakes, and is particularly applicable to brakes for automotive vehicles, its broad object being to provide means whereby a large portion of the retarding or braking force required is derived from the movement to be retarded.

An object of my invention is to provide a brake actuating mechanism whose action is independent of the direction of rotation of the braked wheel.

Another object of my invention is to provide a brake actuating mechanism in which the parts which are subject to mechanical injury are housed within and protected by the brake drum.

Still another object of my invention is to provide a brake operating mechanism actuable by a small physical effort on the part of an operator to produce a relatively great retarding force.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

My invention does not consist in the brake mechanism proper, but rather to the means employed by which the brake mechanism, which latter may be of any standard and suitable construction, is applied. It consists essentially of a friction clutch mechanism mounted within the brake drum, and having the two friction surfaces, one upon the wheel itself and the other upon a member mounted to oscillate about the axis of the wheel, movable by operator-controlled mechanism to bring the two surfaces in contact. It consists of certain combinations of parts, which will be hereinafter particularly defined in the claims.

In the accompanying drawings I have shown my invention embodied in the form of construction which I now prefer to use when applying my invention to a certain type of car brake.

Figure 1:
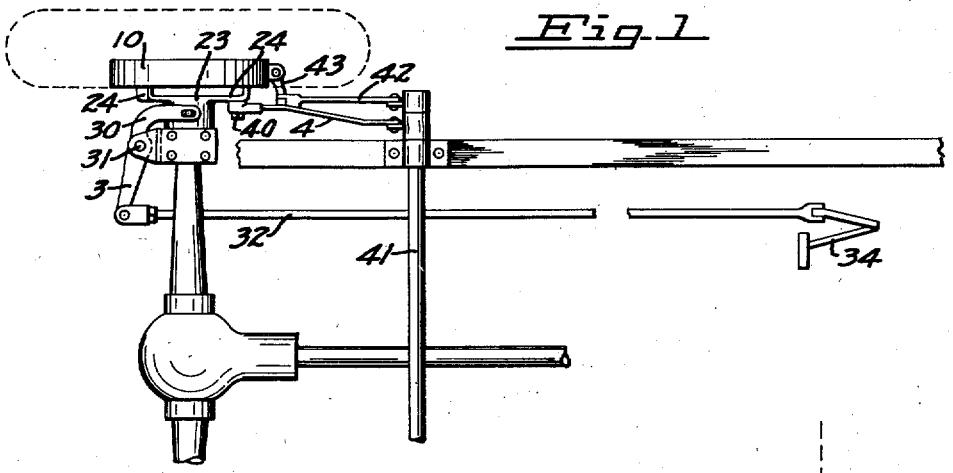
Figure 1 shows in plan view the left rear portion of a standard car chassis, with the drive wheel, my mechanism being applied thereto.
Figure 2:
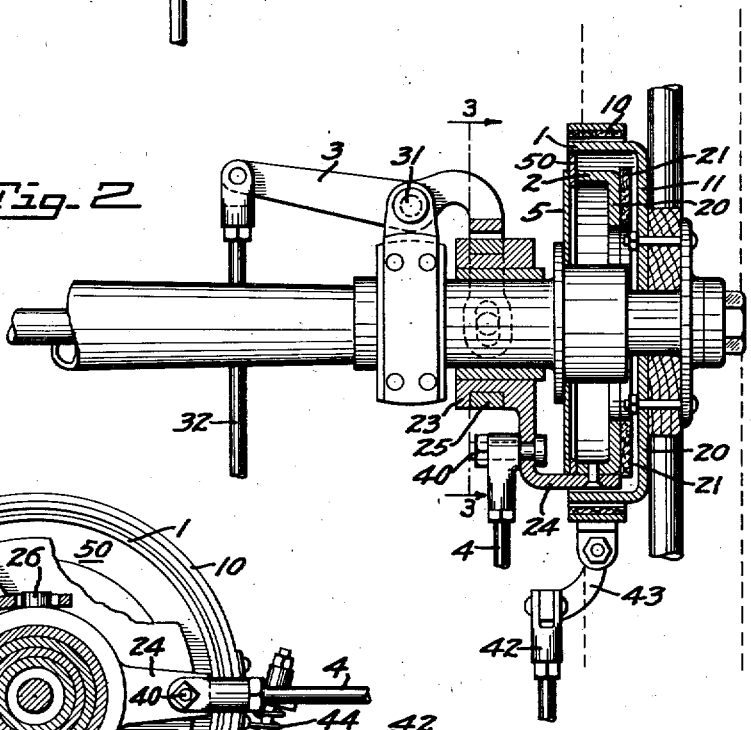
Figure 2 is a detail, showing in horizontal section, so far as the brake mechanism is concerned, the means employed in connection with this invention.
Figure 3:
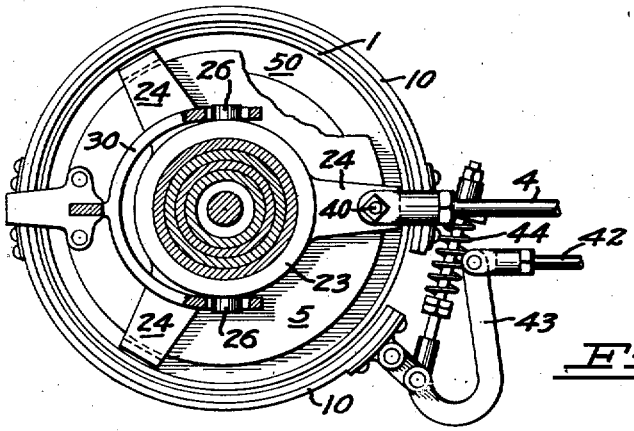
Figure 3 is a section taken upon the line 3—3 of Figure 2.

The type of construction which I have chosen for the illustration of my invention, is one employing a brake drum 1 mounted on the inner face of a wheel, and a brake band 10 engageable therewith and mounted upon the chassis of the vehicle. This is a standard type of construction. It may be added that the principle of my invention may also be applied to other kinds of brakes.

In applying my invention to this particular type of brake, I utilize a portion of the inner surface of the disk 11, which carries the friction surface or rim 1 of the drum. Mounted within the recess or chamber formed by said brake drum, is a ring 2, which ring has an inwardly extending flange 20 carrying a renewable friction ring 21 adapted to be brought into frictional contact with the inner face of the disk 11.

The ring 2 is carried upon a frame which, as illustrated, is in the form of a spider consisting of a central hub 23 and arms 24. This is mounted so that it may turn about the axis of the wheel shaft, and also so that it may be reciprocated axially thereof a limited distance. The hub 23 is provided with a peripheral groove in which is mounted a ring comprising slide members 25, which are provided with pivot hubs at two diametrically opposite points, with which engage the yoke arms 30 of an operating lever 3, which lever is pivoted at 31 upon any suitable or convenient portion of the chassis, or other member fixedly carried upon the chassis.

It is evident that by the oscillation of lever 3, the spider and the oscillating friction member carried thereon, may be forced against the friction surface of the disk 11, thereby producing a turning tendency in the movable friction member 20. This oscillable member has a link, as 4, pivoted thereto as at 40, preferably in a position which, in the normal relation of parts, is aligned with the link 4; that is, the link 4 in neutral position is aligned with a radius extending from the pivot 40 to the rear axle of the car. It is capable of being swung in either direction from the neutral position. It therefore makes no difference which way the wheel moves, the brake would be applied if the friction clutch members just described are in contact.

The link 4 extends forwardly to a connection with a crank arm carried by the usual transverse brake shaft 41, and this transmits the movement through links as 42 to the usual or any suitable brake operating arm 43. The particular construction of this latter mechanism is not an essential part of my invention. My invention is designed for use in connection with various kinds of brake applying mechanisms.

The operating lever 3 has a link or rod 32 connected therewith, and extending forwardly to a connection with the service brake lever 34, or is connected in any suitable way with any lever from which it is desired to operate it.

The operation of my device is evident. When it is desired to apply the brake the usual method of operating a lever is employed. This lever, represented by the lever 34, transmits the effort through link 32 to the lever 3, and this moves the hub of the spider carrying one of the friction clutch members so as to engage it with the other member, which latter member is mounted upon and turns with the car wheel. This by the oscillation of the hub and its spider, exerts a pull through link 4, and this oscillates the usual transverse brake shaft 41. The springs 44 which are ordinarily employed in connection with the standard brake mechanism to secure their normal disengagement, may be relied upon to free the two members of the friction clutch device. An additional spring or springs may be applied if this is found necessary or desirable.

With a device of this character, the effort required by the driver to apply the brake is very slight. The chief power used in applying the brakes is derived from the rotating wheel. The particular construction illustrated and above described is given merely to illustrate the principles of my invention and one preferred manner of carrying out the same. It is evident that many of the details may be changed without affecting the character of the invention. One of the features which I desire to cover, is the manner of obtaining the power through friction clutch devices mounted in the brake drum.

To prevent the chamber enclosed by the brake drum from becoming filled with dirt, I provide a disk 5 which may be carried by the hub of the wheel, and which is of such diameter as to fit snugly inside the arms 24 of the spider. The ring 2, which carries one of the friction members, also carries a ring 50 which extends across the annular slot existing between the outer edge of the disk 5, and the inner surface of the brake drum 1. This maintains a closure sufficiently tight to prevent any material amount of dirt entering this chamber.

What I claim as my invention is:

1. In a brake operating mechanism for automobiles, having a brake drum secured upon a wheel and a brake acting upon said drum, the combination with said drum of a friction clutch device having a friction member carried by and within said drum, a complemental friction member mounted within the drum to oscillate about the wheel axis, a link pivotally connected with said oscillable member and operatively connected with the brake applying mechanism, a grooved hub connected with the oscillable clutch member, a yoke lever engaging said hub by its groove and manually operable means for operating said lever to engage the friction surfaces of the clutch device.

2. The combination with a vehicle brake of the type employing a drum secured upon the vehicle wheel and a brake acting upon said drum, of a hub concentric with the wheel axle inwardly of the brake drum, said hub being freely turnable about said axle and movable toward and from the drum, arms carried by said hub and extending within the brake drum, a friction ring carried by the said arms and adapted to engage the inner side face of the brake drum to be frictionally turned thereby, a brake engageable with the brake drum, brake applying means including a rod connecting said hub and arms, and manually operable means for axially moving said friction ring and its connected parts to engage it with and disengage it from the brake drum to thereby turn said ring and operate the brake.

3. The combination with a vehicle brake of the type employing a drum secured to and at the inner face of a wheel and a brake engageable with said drum, of a hub mounted inwardly of and concentric with the drum, said hub being turnable about and movable lengthwise of the axis of the drum, arms carried by the hub and extending into the drum, a friction ring carried by said arms and engageable with the inner face of the drum to be thereby turned, a disk having openings for said arms and serving as a closure for the inward face of the drum, brake applying means operatively connected with the said arms to be actuated by the turning thereof, and means for manually moving said hub and the parts carried thereby to apply and release the friction members.

4. In a brake operating mechanism for automobiles having a brake drum secured upon the wheel, a friction clutch device having one friction member carried by and within said drum, the complemental member being located within the drum and manually adjustable for limited turning about the drum axis and to be engaged with and disengaged from the friction surface of the drum, a disk fixed relatively to the drum and closing the inner face opening of the drum except for a circular slot, and a ring carried by the manually movable one of the friction clutch members and serving to close said slot.

5. In a brake operating mechanism for vehicles having a brake drum secured upon a wheel and a brake acting on said drum, the combination with said drum of a friction clutch device having a friction member carried by and within said drum, a complemental friction member mounted within the drum to oscillate about the wheel axis, a link pivotally connected with said oscillable member and operatively connected with the brake applying mechanism, a hub slidable along the wheel axis and connected with said oscillable member, and operator-controlled means for sliding said hub to engage the friction surfaces of the clutch device.

6. The combination with a vehicle brake of the type employing a drum secured upon the vehicle wheel and a brake acting upon said drum, of a hub concentric with the wheel axle inwardly of the brake drum, said hub being freely turnable about said axle and movable toward and from the drum, a member carried by said hub and extending within said drum, a friction ring carried by said member and adapted to engage the inner surface of the drum to be frictionally turned thereby, a brake engageable with the brake drum, brake applying means including a link connecting with said hub, and manually operable means for axially moving said friction ring and its connected parts to engage it with and disengage it from the brake drum to thereby turn said ring and operate the brake.

In testimony whereof, I have hereunto set my hand this 2nd day of March, 1929.

CHARLES W. COLLINS.